United States Patent [19]

Spina

[11] Patent Number: 4,869,206

[45] Date of Patent: Sep. 26, 1989

[54] ANIMAL CAGE

[76] Inventor: Gary A. Spina, 2005 Beauty St., Statesville, N.C. 28677

[21] Appl. No.: 243,581

[22] Filed: Sep. 12, 1988

[51] Int. Cl.⁴ .............................................. A01K 1/01
[52] U.S. Cl. ........................................ 119/17; 119/15
[58] Field of Search .............................. 119/15, 17, 19

[56] References Cited

U.S. PATENT DOCUMENTS

| | | | |
|---|---|---|---|
| 2,857,880 | 10/1958 | Stone, Jr. | 119/19 |
| 3,048,147 | 8/1962 | McKean | 119/19 |
| 3,098,465 | 7/1963 | Ivey | 119/17 |
| 3,144,852 | 8/1964 | Messers | 119/19 |
| 3,381,664 | 5/1968 | Barlocci | 119/17 |
| 3,429,297 | 2/1969 | Schroer | 119/17 |
| 3,698,360 | 10/1972 | Rubricius | 119/17 |
| 4,256,056 | 3/1981 | Sou | 119/19 |
| 4,696,257 | 9/1987 | Neary et al. | 119/19 |

FOREIGN PATENT DOCUMENTS 203359  3/1939  Switzerland ......................... 119/19

Primary Examiner—Paul J. Hirsch
Attorney, Agent, or Firm—W. Thad Adams, III

[57] ABSTRACT

An animal cage for permitting collection of solid and liquid animal wastes for analysis. The cage comprises a top, bottom and four sides connected together to define an enclosure, a first floor positioned above the bottom. The first floor has a slope along its full dimension to a single lowest point. A second floor supports an animal and positioned above the first floor. The floor includes perforations for permitting liquid waste to pass therethrough onto the sloped first floor while retaining solid wastes thereon and a litter holder for providing a location for instinctive animal elimination of solid and liquid wastes. The litter holder communicates with the perforations for permitting liquid to pass from the litter holder through the second floor onto the first floor. A liquid collector cooperates with the first floor at its lowest point for permitting collection of liquid flowing there.

16 Claims, 3 Drawing Sheets

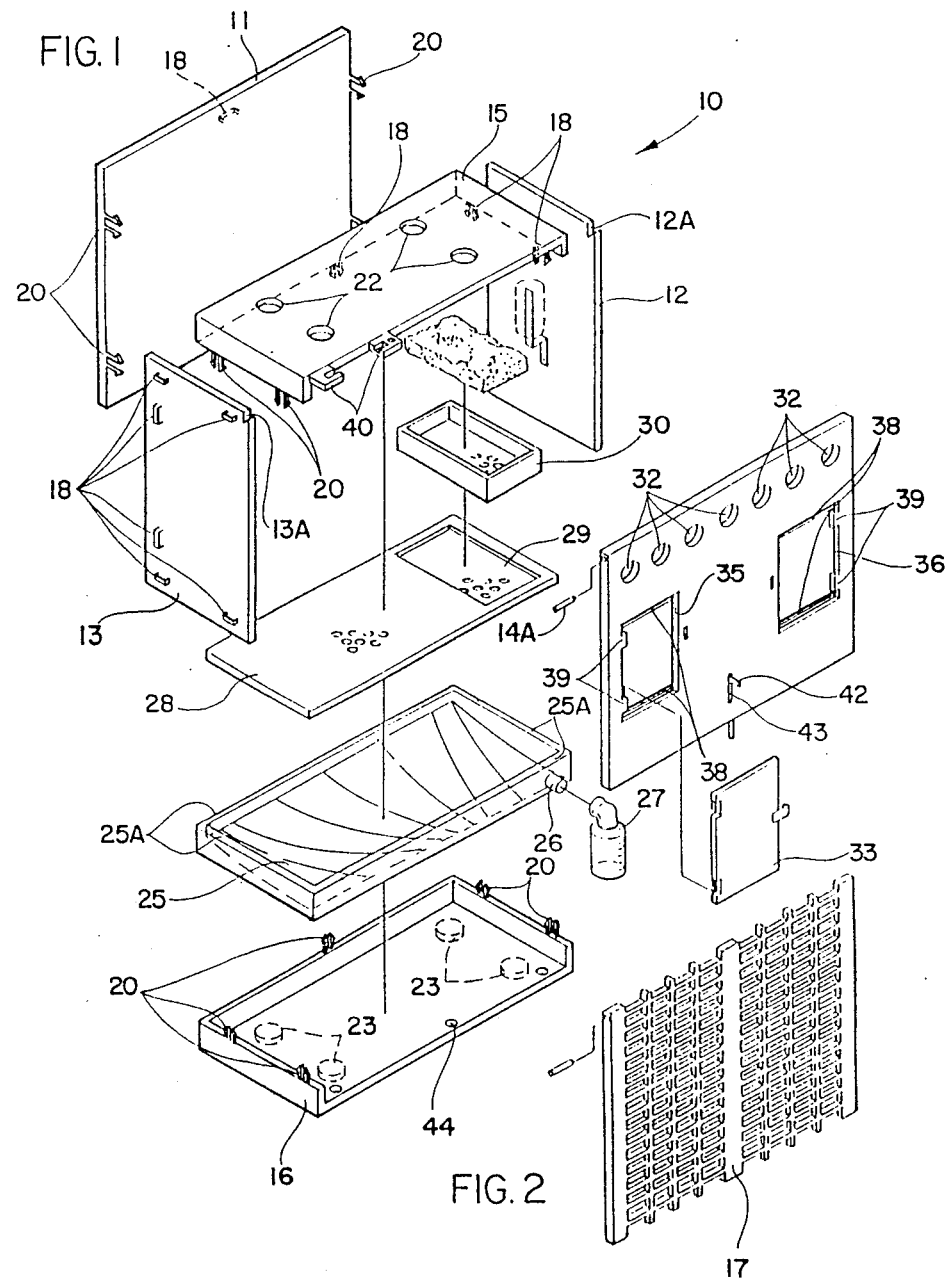

ANIMAL CAGE

TECHNICAL FIELD AND BACKGROUND OF THE INVENTION

This invention relates to an animal cage particularly adapted for use by animal breeders, veterinarians and others who keep numbers of small animals such as cats in relatively confined spaces. The cage actually defines a system which offers a number of advantages over cages of typical design currently in use. The cage described below is easy to assemble and disassemble, easy to keep clean and sanitary, and provides a simple yet effective means of monitoring urine and feces output. Since the parts are standard sized, replacement is easy to effect from cage-to-cage.

U.S. Pat. No. 3,698,360 discloses a small housing unit for an animal which includes a drainage system that is located in the back corner of the unit. The drainage system enables urine and feces to be removed from a tray located under the floor of the unit. A single conduit system serves to remove both liquid and solid waste and is therefore susceptible to clogging. This, in turn, can promote disease in the animals and, at the very least, creates the need for labor to unclog the system.

SUMMARY OF THE INVENTION

Therefore, it is an object of the invention to provide an animal cage which is easy to assemble and disassemble, easy to keep clean and sanitary, and which includes means for monitoring urine and feces output.

These and other objects of the present invention are achieved in the preferred embodiments disclosed below by providing an animal cage for permitting collection of solid and liquid animal wastes for analysis. The cage comprises a top, bottom and four sides connected together to define an enclosure, a first floor positioned above the bottom. The first floor has a slope along its full dimension to a single lowest point.

A second floor supports an animal and positioned above the first floor. The floor includes perforations for permitting liquid waste to pass therethrough onto the sloped first floor while retaining solid wastes thereon and a litter holder for providing a location for instinctive animal elimination of solid and liquid wastes. The litter holder communicates with the perforations for permitting liquid to pass from the litter holder through the second floor onto the first floor.

A liquid collector cooperates with the first floor at its lowest point for permitting collection of liquid flowing there.

According to one preferred embodiment of the invention, the sides also defines a door.

According to another preferred embodiment of the invention, one of the sides includes a door therein.

According to yet another preferred embodiment of the invention, the second floor includes a portion of reduced elevation, and a removable litter box for a holding a litter material for being positioned in the portion of reduced elevation.

According to one preferred embodiment of the invention, one of the sides comprises a grate.

According to another preferred embodiment of the invention, one of the sides defines a front and includes a pair of spaced-apart doors therein.

Preferably, the top, bottom and sides each includes releasable latching means for permitting assembly and disassembly without tools.

According to one preferred embodiment of the invention, the latching means comprise a plurality of slots formed in the some of the top, bottom and sides, and a plurality of mating, complementary prongs carried by other of the top, bottom and sides.

According to another preferred embodiment of the invention, the liquid collector comprises a bottle for being detachably secured to the first floor.

Preferably, the bottom includes a plurality of raised, spaced-apart feet thereon, and the top includes a plurality of spaced-apart recesses for mating with the feet, whereby individual cages are stackable by placement of the feet on the bottom of an upper cage in the recesses of the top of a lower cage, and wherein the feet of a lowermost cage support the cage in spaced-apart relation from a supporting surface.

According to yet another preferred embodiment of the invention, the cage includes wheels for permitting the cage to be rolled from place to place and preferably comprise castors for permitting the cage to be pulled in any direction.

According to one preferred embodiment of the invention, the cage includes means for connecting a plurality of the cages end-to-end for permitting the cages to be pulled in unison in the manner of a train.

Preferably, at least some of the sides include ventilation holes therein.

Preferably, at least one of the sides includes a scratching post for use by an animal within the cage.

According to yet another preferred embodiment of the invention, the cage includes a clipboard holder formed in the top for holding a clipboard.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 1 is an exploded perspective view of an animal cage according to the present invention;

FIG. 2 is an exploded view of an alternative door construction;

DESCRIPTION OF THE PREFERRED EMBODIMENT AND BEST MODE

Figure 3:
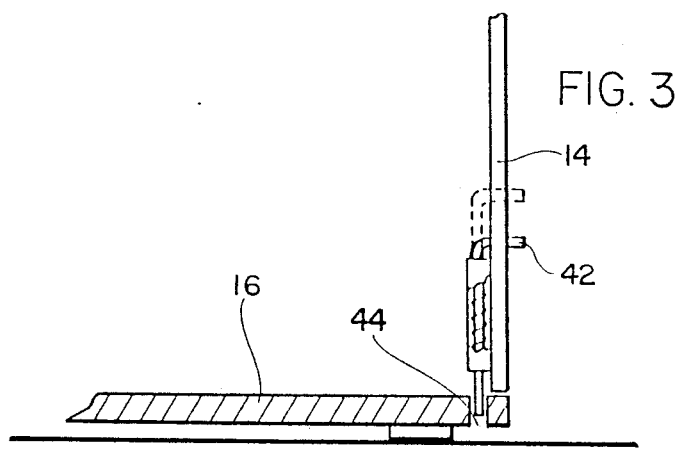
FIG. 3 is a frequency vertical cross-sectional view of the door latch.

Referring now specifically to the drawings, an animal cage according to the present invention is illustrated in FIG. 1 and shown generally at reference numeral 10. According to the preferred embodiment shown in FIG. 1, the cage 10 is formed of four sides or panels—a back 11, two opposed sides 12 and 13, and a front 14, which functions as a door. A top 15 and a bottom 16 complete the enclosure. A preferred size for the cage 10 utilizes a top, bottom, front and back 48 inches long and 24 inches high, with the sides being 24 inches square, to give overall dimensions of 24 inches high by 24 inches deep by 48 inches long. Preferably, the sides, top and bottom are constructed of polyurethane or polypropylene plastic. These materials are inert, resistant to staining, and can be repeatedly cleaned by steam cleaning or otherwise to prevent the spread of disease. The sides, top and bottom may be solid, as shown in FIG. 1, or may be formed of slatted material, as is shown in the form of a slatted front door 17 in FIG. 2. Any combination of slatted and solid panels may be used as is desired.

The sides 11–14 and the top and bottom 15 and 16 are connected together by male and female plastic latches 18 and 20, respectively, as is shown in FIG. 1. These latches permit easy and repeated assembly and disassembly without tools.

Front 14 is pivotally mounted by pins 14A which are positioned in notches 12A and 13A in sides 12 and 13, respectively. The front 14 is latched by a latch 42 which resides in a slot 43 and which normally extends down into a latch hole 44 in bottom 16. See FIG. 3. Front 17 as shown in FIG. 2 is similarly mounted and latched.

The top 15 is provided with four regularly spaced recesses 22 in the top surface, and the bottom 16 is provided with four regularly spaced protruding feet 23 which mate with the recesses 22 of the top of another cage 10 positioned beneath.

Figure 4:
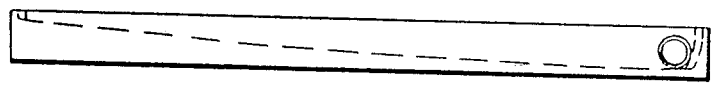
FIG. 4 is a side elevation view of the sloped first floor.

Bottom 16 is designed to received a first, sloped floor 25. The sloped floor surface leads from all points on the surface to a lowest point in one front corner where a drain tube 26 permits liquid waste to be collected in a matingly-fitted collection bottle 27. The structure is shown in FIG. 4 as well as FIG. 1. As is shown in FIG. 1, floor 25 includes flat edges 25A which support a second floor 28, which is perforated to permit liquid waste to flow down onto floor 25 while retaining solid waste. One side of floor 27 includes a molded recess 29 for receiving a litter box 30 which also has a perforated bottom.

The perforations in the bottom of litter box 30 mate and communicate with the perforations in the floor 28, thereby permitting liquid waste deposited in the litter box 30 to flow onto sloped floor 25 and into the collection bottle 27. As with the floor 28, litter box 30 retains any solid waste. Both solid and liquid waste can thereby be collected and analyzed and/or weighed in connection with medical treatment or growth monitoring of the animal.

The door in FIG. 1 is preferably constructed of transparent material which allows visual observation of the interior of the cage. A plurality of air holes 32 allow proper ventilation. Two doors 33 (one shown) are positioned in spaced-apart relation in suitably sized openings 35, 36 on front 14. The edges of openings 35, 36 are lipped with raised lips to prevent the doors 33 from opening back into the interior of cage 10. Doors 33 are hinged by integrally-formed hinge tabs 39 which cooperate with hinge pins positioned on one side of doors 33 in the manner shown in FIG. 1.

The front of top 15 includes spaced clips 40 for holding a clipboard and pencil (not shown).

Figure 5:
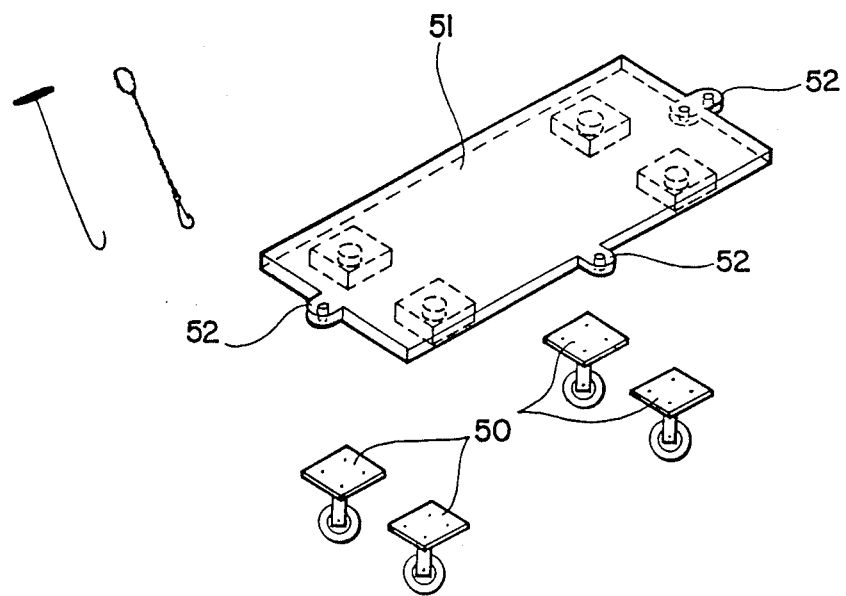
FIG. 5 is an exploded perspective view of an alternate bottom, illustrating means for mounting the cage on wheels and towing several of the cages.

An alternative embodiment of the bottom of the cage 10 is shown in FIG. 5. The cage is adapted to be pulled in the manner of a train by the provision of caster wheels 50 positioned on the underside of a bottom 51. Alternatively, axles with wheels mounted thereon can be provided. This view is not shown since the feature, per se, is completely conventional. The caster wheels 50 offer the advantage that the cage can be pulled either from the end or from the front by the provision of connectors 52.

I claim:

1. An animal cage for permitting collection of solid and liquid animal wastes for analysis and comprising:
   (a) a top, bottom and four sides connected together to define an enclosure,
   (b) a first floor positioned above said bottom, said first floor having a slope along its full dimension to a single lowest point;
   (c) a second floor for supporting an animal and positioned above said first floor, said second floor including:
      (i) perforation means for permitting liquid waste to pass therethrough onto the sloped first floor while retaining solid wastes thereon;
      (ii) litter holding means for providing a location for instinctive animal elimination of solid and liquid wastes, said litter holding means communicating with said perforation means for permitting liquid to pass from the litter holding means through the second floor onto said first floor; and
   (d) liquid collection means cooperating with said first floor at its lowest point for permitting collection of liquid flowing there.

2. An animal cage according to claim 1, wherein one of said sides also defines a door.

3. An animal cage according to claim 1, wherein one of said sides includes a door therein.

4. An animal cage according to claim 1, wherein said second floor includes a portion of reduced elevation, and a removable litter box for a holding a litter material for being positioned in said portion of reduced elevation.

5. An animal cage according to claim 1, wherein one of said sides comprises a grate.

6. An animal cage according to claim 1, wherein one of said sides defines a front and includes a pair of spaced-apart doors therein.

7. An animal cage according to claim 1, wherein said top, bottom and sides each includes releasable latching means for permitting assembly and disassembly without tools.

8. An animal cage according to claim 7, wherein said latching means comprise a plurality of slots formed in said some of said top, bottom and sides, and a plurality of mating, complementary prongs carried by other of said top, bottom and sides.

9. An animal cage according to claim 1, wherein said liquid collection means comprises a bottle for being detachably secured to said first floor.

10. An animal cage according to claim 1, wherein said bottom includes a plurality of raised, spaced-apart feet thereon, and said top includes a plurality of spaced-apart recesses for mating with said feet, whereby individual cages are stackable by placement of the feet on the bottom of an upper cage in the recesses of the top of a lower cage, and wherein said feet of a lowermost cage support said cage in spaced-apart relation from a supporting surface.

11. An animal cage according to claim 1, and including rolling means for permitting said cage to be rolled from place to place.

12. An animal cage according to claim 11, wherein said rolling means comprise castors for permitting said cage to be pulled in any direction.

13. An animal cage according to claim 12, wherein said cage includes means for connecting a plurality of said cages end-to-end for permitting said cages to be pulled in unison in the manner of a train.

14. An animal cage according to claim 1, wherein at least some of said sides include ventilation holes therein.

15. An animal cage according to claim 1, wherein at least one of said sides includes a scratching post for use by an animal within the cage.

16. An animal cage according to claim 1, and including a clipboard holder formed in the top for holding a clipboard.

* * * * *